United States Patent [19]

Jensen

[11] Patent Number: 4,712,827
[45] Date of Patent: Dec. 15, 1987

[54] CONVERTIBLE CAR

[75] Inventor: Jakob Jensen, Viborg, Denmark

[73] Assignee: Logicar A/S, Viborg, Denmark

[21] Appl. No.: 15,028

[22] Filed: Feb. 17, 1987

Related U.S. Application Data

[63] Continuation of Ser. No. 860,046, May 6, 1986, abandoned, Continuation of Ser. No. 711,515, Mar. 6, 1985, abandoned.

[30] Foreign Application Priority Data

Jul. 6, 1986 [DK] Denmark ............................ 3119/83

[51] Int. Cl.⁴ ........................ B60J 7/08; B62D 33/04
[52] U.S. Cl. ................................ 296/99 R; 296/106; 296/10; 296/98
[58] Field of Search ............... 860/46; 296/10, 55, 296/107, 108, 106, 98, 26, 183, 216, 99 R

[56] References Cited

U.S. PATENT DOCUMENTS

| | | | |
|---|---|---|---|
| 1,608,458 | 11/1926 | Barbiers | 296/99 R X |
| 1,786,693 | 12/1930 | Blass | 296/10 X |
| 1,924,030 | 8/1933 | Elser | 296/99 R |
| 3,419,304 | 12/1968 | Sangimino | 296/99 R |
| 3,823,977 | 7/1974 | Fioravanti | 296/107 X |
| 3,992,053 | 11/1976 | Hrytzak et al. | 296/136 |
| 4,046,416 | 9/1977 | Penner | 296/98 |

FOREIGN PATENT DOCUMENTS

| | | | |
|---|---|---|---|
| 1572209 | 6/1969 | France | 296/99 R |
| 472842 | 9/1975 | U.S.S.R. | 296/99 R |

Primary Examiner—Dennis H. Pedder
Attorney, Agent, or Firm—Antonelli, Terry & Wands

[57] ABSTRACT

A convertible car having an extendible and contractible rear cabin section. A cabin roof section is pivotally lowerable to a load carrying position and a rearmost cabin portion is forwardly displaceable over the lowered roof section into engagement with a forwardmost cabin portion to contract the cabin.

4 Claims, 7 Drawing Figures

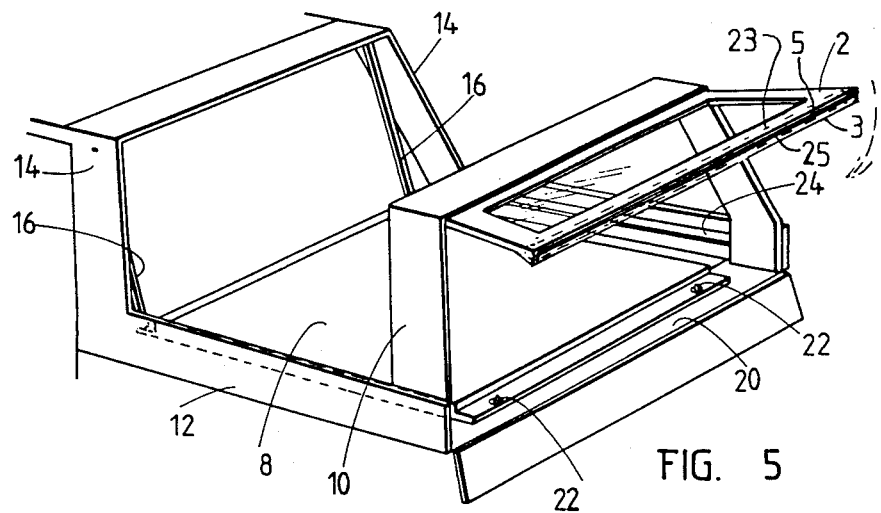
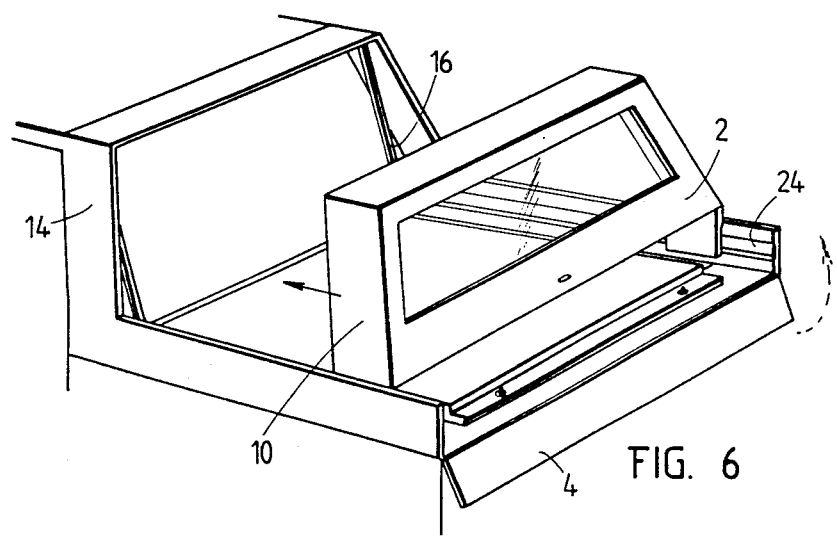
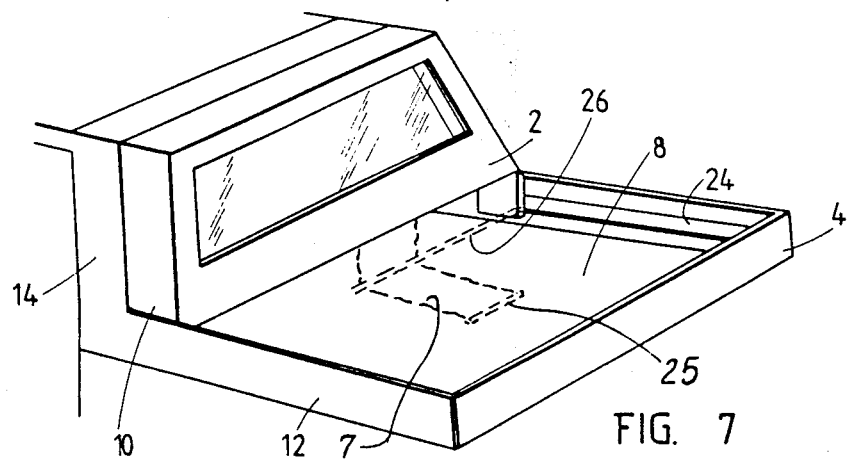

CONVERTIBLE CAR

This is a continuation of application Ser. No. 860,046, filed May 6, 1986, now abandoned, which is a continuation of application Ser. No. 711,515 filed Mar. 6, 1985, now abandoned.

The present invention relates to a convertible car with a cabin, the rear part of which is convertible into a platform.

The purpose of the invention is to provide such a car, in which the rear cabin part is easily convertible into an open platform, even though the cabin is made as a rigid shell structure.

The invention, which is specifically defined in the appended claims, will now be described with reference to the drawings, which illustrate, in a series of perspective views, FIGS. 1–7, the conversion of a car according to a preferred embodiment of the invention.

Figure 1:
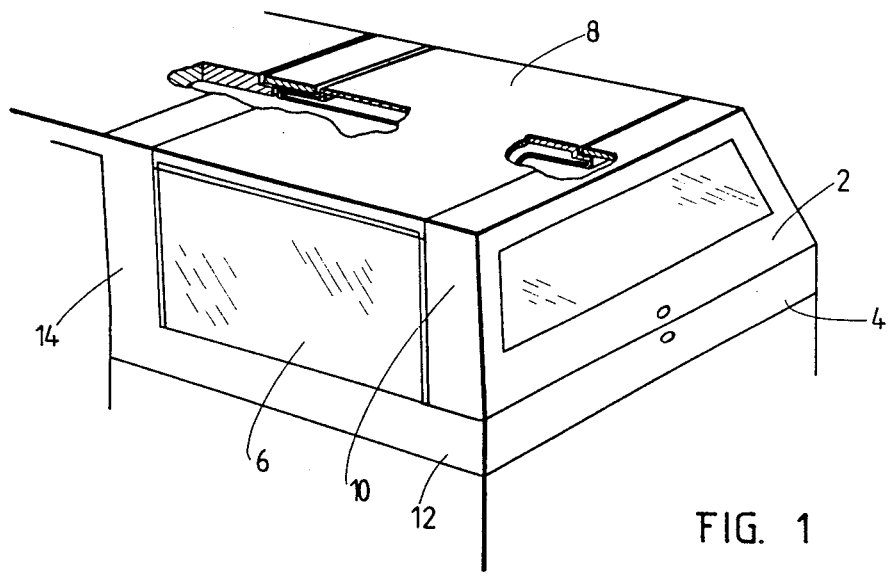

In FIG. 1 is shown the upper rear end of the cabin of an automobile. This rear cabin portion may be equipped with one or more passenger seats, which are preferably foldable as in so-called station cars, the rear cabin portion of which is convertible into a cargo space by folding down the seats in this portion, which is then accessible through a rear cabin door. Such a rear cabin door is designated 2, and FIG. 1 further shows an underlying drop flap 4, a side window 6 and a roof member 8 belonging to the rear cabin portion. The rear cabin door 2 is mounted in a rear, upstanding frame portion 10 arranged as a cross member between outer side panels 12, which are rearwardly flush with the drop flap 4. Frontwise the side panels 12 are connected with a similar, upstanding frame portion 14, in front of which the driver's cabin portion is located.

Figure 2:
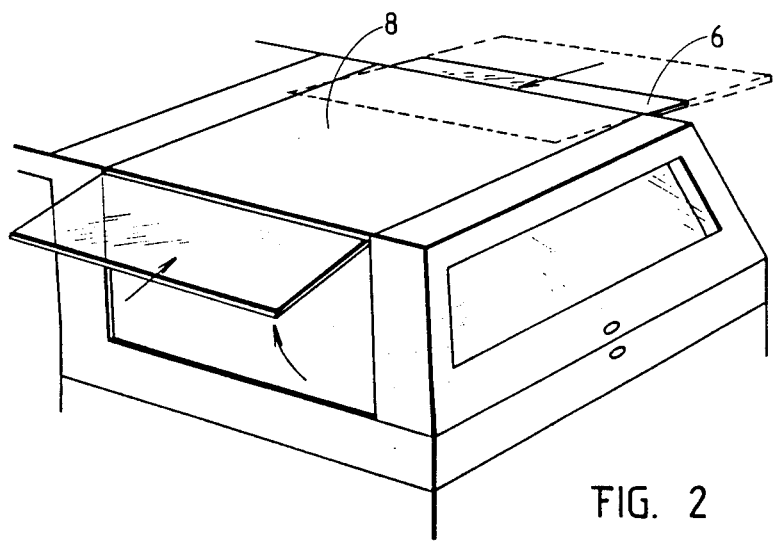

The roof member 8 is a separate element, which is secured to the upper parts of the frame portions 10 and 14 by means of suitable fasteners (not shown). The roof member is a hollow shell element, which is open along its side edges so as to be able to receive the side windows 6, when these have been pivoted outwardly and upwardly, as shown in FIG. 2, the windows 6 being pivotal about upper hinge means into a horizontal position, from which they are displaceable into the cavity of the hollow roof member 8, for complete reception therein.

Figure 3:
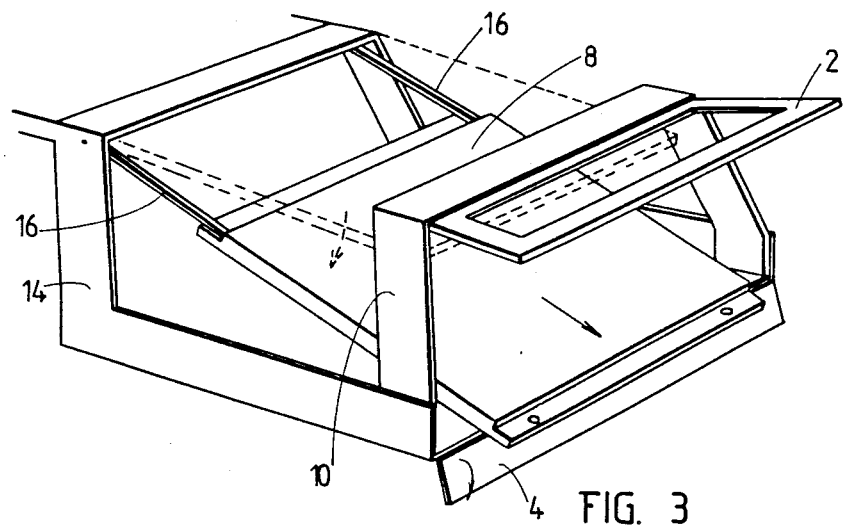

At its rear end the roof member 8 is carried in a releasable manner by the rear frame portion 10, by means of releasable fasteners (not shown), which are easily accessible from the rear when the top hinged rear cabin door 2 has been opened, as shown in FIG. 3. Frontwise the roof member is hinged to the front frame portion 14 such that upon release of the said fasteners at the rear the roof member may be swung down, as illustrated by dotted lines in FIG 3. The pivot connection between the roof member and the frame portion 14 is established between the upper ends of the side portions of the frame portion and the front ends of respective telescopic rods 16, which are retractably housed inside the roof member 8, along the side edges thereof, above or beneath the side openings, through which the side windows 6 were introduced into the roof member. As shown in FIG. 3 it is now possible to pull the roof member 8 in a downward and rearward direction, preferably upon the drop flap 4 having been swung down, the telescopic rods 16 hereby becoming visible.

Figure 4:
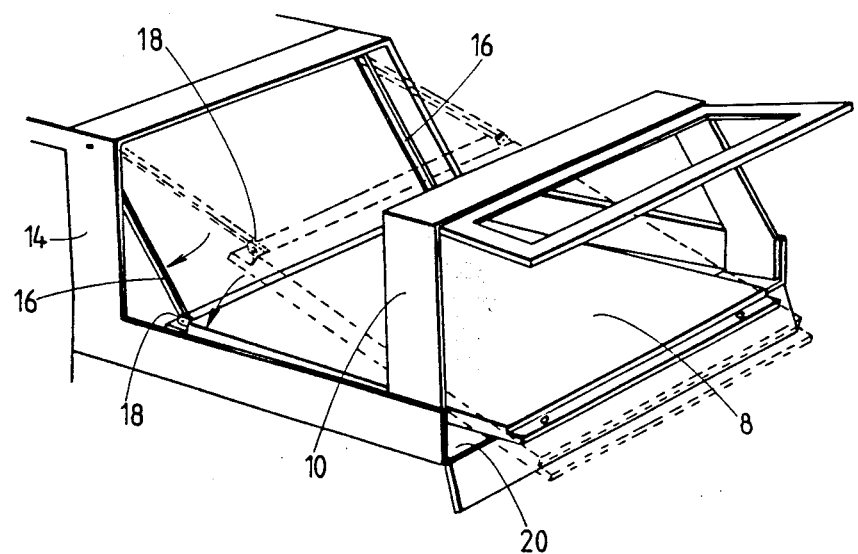

By this pulling out of the roof member 8 a maximum retracted position as shown in dotted lines in FIG. 4 is reached, wherein a knee link 18 on each of the rods 16 is exposed just outside the front edge of the roof member 8. Thereafter or thereby the roof member 8 and the rods 16 are brought to pivot downwardly as shown in full lines in FIG. 4, whereby the roof member 8 will get forwardly displaced, resting on a rear traverse 20.

The final positions of the rods 16 and the roof member 8 are shown in FIG. 5. In a preferred embodiment the rods 16 hang down in a vertical plane, slightly rearwardly inclined, e.g. corresponding to the rearward inclination of the side portions of the transverse frame portion 14, though these side portions are additionally outwardly inclined, while the rear of the roof member 8 is supported on the traverse 20 and is indisplaceably secured thereto by means of any suitable fastening arrangement such as a simple holding pin engagement 22.

The roof member 8 will now constitute a cargo carrier plate, which is loadable from above.

In a preferred embodiment there are at more places, particularly frontwise, arranged additional support members for the cargo carrier plate, e.g. bracket carried rubber blocks, but it is deemed unnecessary to describe this arrangement in more detail. Also rearwise a special block support may be provided for, whereby the top side of the roof member 8 (FIG. 5) may be flush with the top side of the traverse 20.

Hereafter the rear cabin door 2 is closed.

The rear frame portion 10 is carried by the side panels 12 in being lengthwise displaceably engaging with holding tracks 24 on the inside of the side panels, the side portions of the frame portion 10 having lower, outer protrusions for engaging these tracks 24. As shown in FIG. 6 it is hereby made possible that the frame portion 10 with the rear cabin door 2 can be displaced forwardly over the roof or cargo carrier plate 8 into the position shown in FIG. 7, in which the frame portion 10 is locked, by suitable locking means, to the frame portion 14 as now closely juxtaposed to the frame portion 10. The conversion into an open cargo carrier has now been finished, the roof element 8 now being usable as an open carrier platform.

With the embodiment shown, in which the side portions of the frame portions 10 and 14 are downwardly and outwardly inclined, it may be necessary to accept that the cargo carrier plate 8 will be narrower than the distance between the side panels 12, whereby free spaces may occur outside the side edges of the carrier plate 8. Such spaces, however, may be filled out by means of separate plate elements, or the arrangement may be such that the windows (FIG. 2) as introduced into the carrier or roof plate element are not fully introduced, whereby they can add to the effective width of cargo carrier plate, here provided that the carrier plate is not subjected to excessive loads.

It will be the original top side of the roof element which is now constituting the top side of the cargo carrier plate, and all according to the operational demands it may be acceptable that the top side of the roof is constituted by a surface, which is now and then subjected to rough influences when used for cargo carrying purposes.

Should the roof surface be desired to show a nice and usual appearance the same surface may be protected, in the cargo carrying position thereof, by covering it with a loose wear plate portion or a strong sheet material.

This possibility of covering the cargo carrying surface may be integrated in the design, viz. by mounting adjacent one or the other side or end of the carrier surface according to FIG. 5 a rolled up sheet, which may be drawn out over the carrier surface. Particularly advantageously such a sheet roll may be arranged as built into the rear cabin door 2, near the lower edge thereof, like a roller blind, whereby the outer free end of the sheet may be gripped, e.g. upon the rear frame portion 10 having been displaced into its front position (FIG. 7), and the sheet be drawn rearwardly over the carrier surface and fastened endwise just in front of the drop flap 4.

In FIG. 5 is shown a widened housing portion 3 along the outer (lower) edge of the rear door 2, the sheet roll inside this housing being designated 23. The free sheet end projects through a bottom slit 5 of the housing 3 and is provided with a drawbar 25 outside the slit.

From its roll 23 adjacent the lower edge of the rear door 2 the sheet or tarpaulin, designated 7, may be guided underneath a cross rod 26 (FIG. 7) as arranged between the lower ends of the opposite side portions of the frame portion 10, such that the sheet already when being pulled out will stretch flat along the carrier surface and also form a vertical rear wall portion in the remaining front cabin, between the lower edge of the rear door 2 and the carrier surface. With the use of a relatively heavy sheet material a width corresponding to the entire length of the lower edge of the rear door 2 the unrolled sheet will project laterally beyond the side edges of the carrier surface so as to fill out the said free space outside these edges in a to some degree carrying manner.

The invention is in no way limited to the embodiment as shown in the drawing, particularly not with respect to the manner in which the roof member 8 is guided from its roof position to its carrier position; other guiding systems may be used, when they are also suitable for the inversed conversion of the car, from a platform car into a closed cabin car. It will be appreciated, however, that the system as shown and described is highly suitable for both types of conversion.

It should be mentioned that in practice the rear frame portion 10 should preferably be in sliding engagement with the side panels 12 by slidingly engaging in a top edge groove of the side panels 12 rather than in a lateral groove 24 as shown in FIGS. 6 and 7.

I claim:

1. A convertible car having a cabin, the rear part of which is convertible into an open platform section, the rear cabin portion being provided with a roof section convertible into a carrier platform, said roof section being releasable from a supporting engagement with a foremost and a rearmost cabin frame portion for being guidable downwardly in a carrier platform position, the rearmost of said cabin frame portions thereafter being forwardly displaceable into engagement with the foremost cabin frame portion, the roof section is connected with the foremost cabin frame portion by a pair of rod means telescopically held within the roof section and pivotally secured to said foremost frame portion, each of said rod means having a pivotal joint, which is withdrawn from within the roof section by rearward retraction of the roof section upon the rear end of the roof section having been released and swung down from the rear cabin frame portion, said pivotal joints being located so as to enable, upon their being withdrawn, said rod means to be downwardly pivotable for lowering of a front end of the roof section to the carrier position during concurrent forward displacement of the roof section, while the rear of the roof section is freely lowerable into engagement with support means at the desired carrier platform height.

2. A convertible car according to claim 1, characterized in that a sheet roll is mounted along an edge portion of the lowered roof section such that a cover sheet may be drawn over the top side of the lowered roof section, said roll being housed in the lower end of an openable rear cabin door as mounted on the rear cabin frame portion.

3. A convertible car according to claim 1, characterized in that a cross rod is arranged between opposed lower side portions of the rear cabin frame portion in a level just above the carrier platform level of the lowered roof section.

4. A convertible car according to claim 1, wherein said rearmost cabin frame portion includes a door opening for a rearwardly openable door, and wherein said pivotal joints are located so as to require said roof portion to be retracted to a position in which the rear end of the roof portion is located behind said door opening with said rearmost cabin frame portion in its rearmost position so as to withdraw said pivotal joints.

* * * * *